(12) United States Patent
Black, Jr.

(10) Patent No.: US 7,717,570 B2
(45) Date of Patent: *May 18, 2010

(54) IMAGE PROJECTOR DISPLAY DEVICE

(75) Inventor: Frederick Stanley Black, Jr., Midlothian, VA (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/356,026

(22) Filed: Jan. 19, 2009

(65) Prior Publication Data
US 2009/0185143 A1 Jul. 23, 2009

Related U.S. Application Data

(63) Continuation of application No. 11/850,912, filed on Sep. 6, 2007, now Pat. No. 7,478,912, which is a continuation of application No. 11/209,837, filed on Aug. 24, 2005, now Pat. No. 7,267,444.

(60) Provisional application No. 60/604,495, filed on Aug. 26, 2004.

(51) Int. Cl.
*G03B 21/14* (2006.01)
(52) U.S. Cl. .......................................... 353/70; 353/79
(58) Field of Classification Search .................. 353/43, 353/69, 70, 79, 102, 119
See application file for complete search history.

(56) References Cited

U.S. PATENT DOCUMENTS

| 1,199,460 | A  | 9/1916  | Featherstone     |
| 1,651,574 | A  | 12/1927 | Beechlyn         |
| 3,539,798 | A  | 11/1970 | Perry            |
| 4,089,599 | A  | 5/1978  | Kuboshima        |
| 5,517,264 | A  | 5/1996  | Sutton           |
| 5,836,664 | A  | 11/1998 | Conner et al.    |
| 6,224,215 | B1 | 5/2001  | Maximus et al.   |
| 6,253,505 | B1 | 7/2001  | Wefringhaus et al. |
| 6,746,124 | B2 | 6/2004  | Fischer et al.   |
| 7,267,444 | B2 | 9/2007  | Black, Jr.       |
| 7,478,912 | B2 | 1/2009  | Black, Jr.       |

FOREIGN PATENT DOCUMENTS

WO 2006-026320 A2 3/2006

OTHER PUBLICATIONS

"International Search Report" and "Written Opinion of the International Search Authority" (United States) in Be Seen! Solutions, Inc., International Patent Application Serial No. PCT/US2005/30176, dated Nov. 21, 2006, 5 pages.

*Primary Examiner*—William C Dowling
(74) *Attorney, Agent, or Firm*—Tillman Wright, PLLC; James D. Wright; Chad D. Tillman

(57) ABSTRACT

An image projector display device projecting an image onto a surface substantially parallel to a path of light emitted through a representation of an image and a projection/objective lens. The display device compensates for the varying distances of the surface onto to which the image is projected from the projection/objective lens to display a clear, non-distorted image.

20 Claims, 5 Drawing Sheets

IMAGE PROJECTOR DISPLAY DEVICE

CROSS-REFERENCE TO RELATED APPLICATION

The present application is a U.S. continuation patent application of, and claims priority under 35 U.S.C. §120 to, U.S. patent application Ser. No. 11/850,912, filed on Sep. 6, 2007, now U.S. Pat. No. 7,478,912 on Jan. 20, 2008, which '912 application published as U.S. patent application publication 2008/0024734, and which '912 application is a U.S. continuation patent application of, and claims priority under §120 to, U.S. patent application Ser. No. 11/209,837, filed on Aug. 24, 2005, now U.S. Pat. No. 7,267,444, and which '837 application is a nonprovisional application of, and claims priority under 35 U.S.C. §119(e) to, U.S. provisional patent application 60/604,495, filed on Aug. 26, 2004.

The disclosure of each of the above mentioned U.S. patent applications, any and all publications thereof, and patents is hereby incorporated herein by reference.

BACKGROUND OF THE INVENTION

1. Field of the Invention

The invention generally relates to projecting an image onto a surface that is substantially parallel to an axis of light passing through an objective lens, and more particularly to projecting an image from an image representation onto a surface where the angle from one portion of the image representation to the surface is different than the angle from at least one other portion of the image representation.

2. Description of Related Art

A typical image projector will shine a light source towards an image representation, such as a slide or transparency. The light then passes through an objective lens that will magnify the image representation to display an image on a surface.

A well-known image projector currently available is a slide projector. An optical path for a typical slide projector is shown in FIG. 1.

Normally, a slide projector comprises a light source 101 that projects light towards a slide 109 that includes a representation of an image. The light source 101 may have a reflective mirror (not shown) to reflect scattered light back towards the slide, and a lens 105 may be interposed between the light source 101 and the slide 109 to further concentrate light onto the slide. While a condenser lens is shown, a no-sphere (planoconvex) lens could also be used for this purpose. The light beam then passes through a projection/objective lens 115 that magnifies the image and projects it for display onto a surface 120, like a screen or wall. A field lens (not shown) could also be provided that further focuses the entire light beam passing through the slide 109 onto the objective lens 115. The light source 101, slide 105, and objective lens 115 are aligned along a common axis of light. This axis is substantially perpendicular to the surface 120 onto which the image is projected.

Another type of well-known projector is an overhead projector (not shown). Generally, the transparency is substantially perpendicular to the projected image. The light source will shine up through an image representation, which is normally referred to as a transparency, to a housing containing the lenses for projecting the image. The overhead lens housing will include some kind of condenser lens, normally a fresnel lens, to collect light shined through the transparency and direct it to a pupil of an objective lens. The objective lens then projects the image much in the sane way as the objective lens in the slide projector. A mirror is then used to redirect the image projected from the objective lens so that the final projected image can be displayed on the surface, which is substantially perpendicular to the transparency. But like a slide projector, the plane of the surface is substantially perpendicular to the direction of light projecting the image from the overhead projector.

In both the slide projector and the overhead projector, the projected image can be easily focused because the distance from the objective lens to the surface is substantially similar for the entire projected image. Therefore, the entire projected image can be at a substantially similar distance from a focal point of the objective lens.

The arrangement of either the slide projector or the overhead projector, however, would not be suitable for projecting an image onto a surface that is substantially parallel to the direction of light projected to display an image. Some portions of the projected image would be much closer to the objective lens, while other portions would be much further from the objective lens. This would distort the image so that the image projection portions closer to the objective lens would appear shortened, and the portions further from the objective lens would appear elongated. As a result, the projectors described above would display the image on a substantially parallel surface with a "fun-house" mirror like effect.

To properly display an image on the substantially parallel surface, a display device like an image projector must account for the varying distances throughout the image projection from the projection/objective lens.

SUMMARY OF THE INVENTION

The invention avoids the disadvantages and drawbacks of the related art by allowing a proper display of an image.

The invention thus provides a device for projecting an image onto a surface that is substantially parallel to an axis of the light passing through the objective lens.

According to an aspect of the invention, a device for displaying an image includes a light source, an image representation disposed in a path of light emitted from the light source, and an objective lens disposed proximate the image representation to project an image projection onto a surface substantially parallel to the path of light emitted from the light source through the image representation and the objective lens, wherein the image projection is substantially similar to the image.

The device may further include a reflection mirror reflecting light emitted from said light source toward the image representation. The device may also include a planoconvex lens disposed between said light source and the image representation, and adjacent to the image representation. In addition, a fresnel lens may be disposed between the image representation and the objective lens. The light source may be a light emitting diode. The distance from the light source to a center of the objective lens is at a range of about 75 mm and about 225 mm. The image representation may be a distorted representation of the image, or the image representation may be substantially similar to the image. The image projection may be at least about 15 times greater in size than said image representation. An angle between an axis of light projected from a center of the objective lens and the surface may be less than about 10 degrees.

According to another aspect of the invention, a device for displaying an image includes a means for emitting light, such as a light bulb, LED or the like, a means for representing the image, such as an image representation slide, disposed in a path of light emitted from the light emitting means, and a means for projecting the image, such as an object lens, disposed proximate the image representation means to project an image projection onto a surface substantially parallel to the path of light emitted from the light emitting means through said image representation means and said image projecting means, wherein the image projection is substantially similar to the image.

The device may also include a means for projecting light, such as a reflection mirror or a condenser lens, from said light emitting means towards said image representation means. The device may also include a means for diffracting light, such as a fresnel lens, to orient an angle of light incident to said image projecting means. The device may also include a means for concentrating light, such as a condenser lens, projected from said light projecting means towards said image representation means. In addition, the distance from the light emitting means to a center of the image projecting means is at a range of about 75 mm and about 225 mm. The projected image may be about 15 times greater in size than said image representation means. Further, an angle between an axis of light projected from a center of said image projecting means and the surface is less than about 10 degrees.

A further aspect of the invention provides a night light for displaying an image including a light emitting diode (LED), a representation of the image disposed in a path of light emitted from the LED, an objective lens disposed proximate the representation of the image to project a projected image onto a surface substantially parallel to the path of light emitted from the LED through the representation of the image and the objective lens, and an orientation lens that orients an angle of light incident to the objective lens, wherein the projected is substantially similar to the image.

The night light may also include a reflection mirror reflecting light from the LED toward the representation of the image and a concentration lens that concentrates light from the LED onto the representation of the image. The night light may further include a condensing lens disposed between the LED and the representation of the image.

Additional features, advantages and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed. For example, while the invention was developed to solve certain problems in night light displays, it may be used in other applications and with other devices where an image display is desirable.

BRIEF DESCRIPTION OF THE DRAWINGS

The accompanying drawings, which are included to provide a further understanding of the invention, are incorporated in and constitute a part of this specification, illustrate embodiments of the invention, and together with the detailed description serve to explain principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
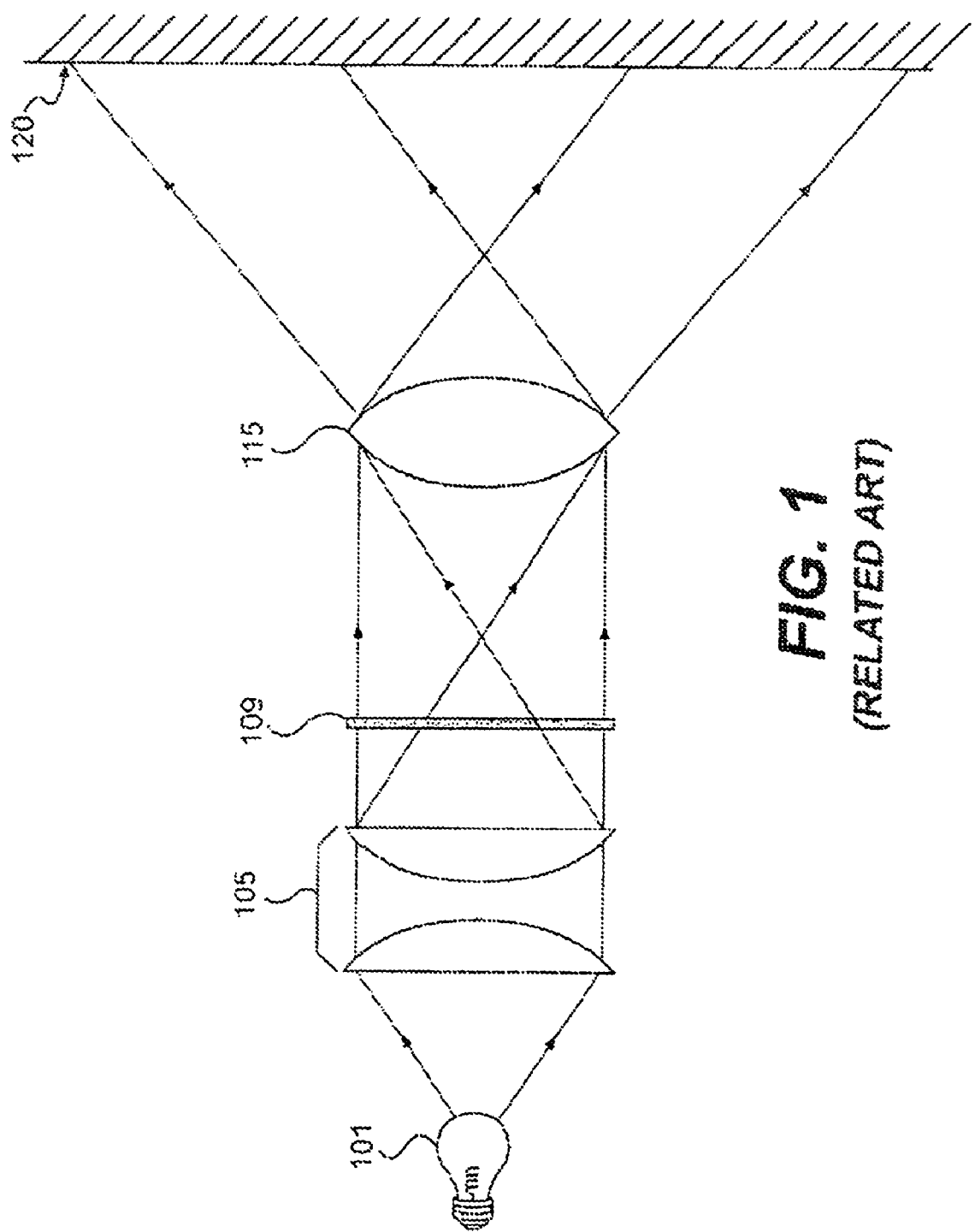
FIG. 1 illustrates an optical path of typical slide projector.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

The invention discloses an image display device that displays an image onto a surface that is substantially parallel to the direction of light passing through a representation of an image and the projection/objective lens. Examples of such devices include, but are not limited to, night lights, floor or desktop mounted displays, advertisement displays, and the like.

Figure 2:
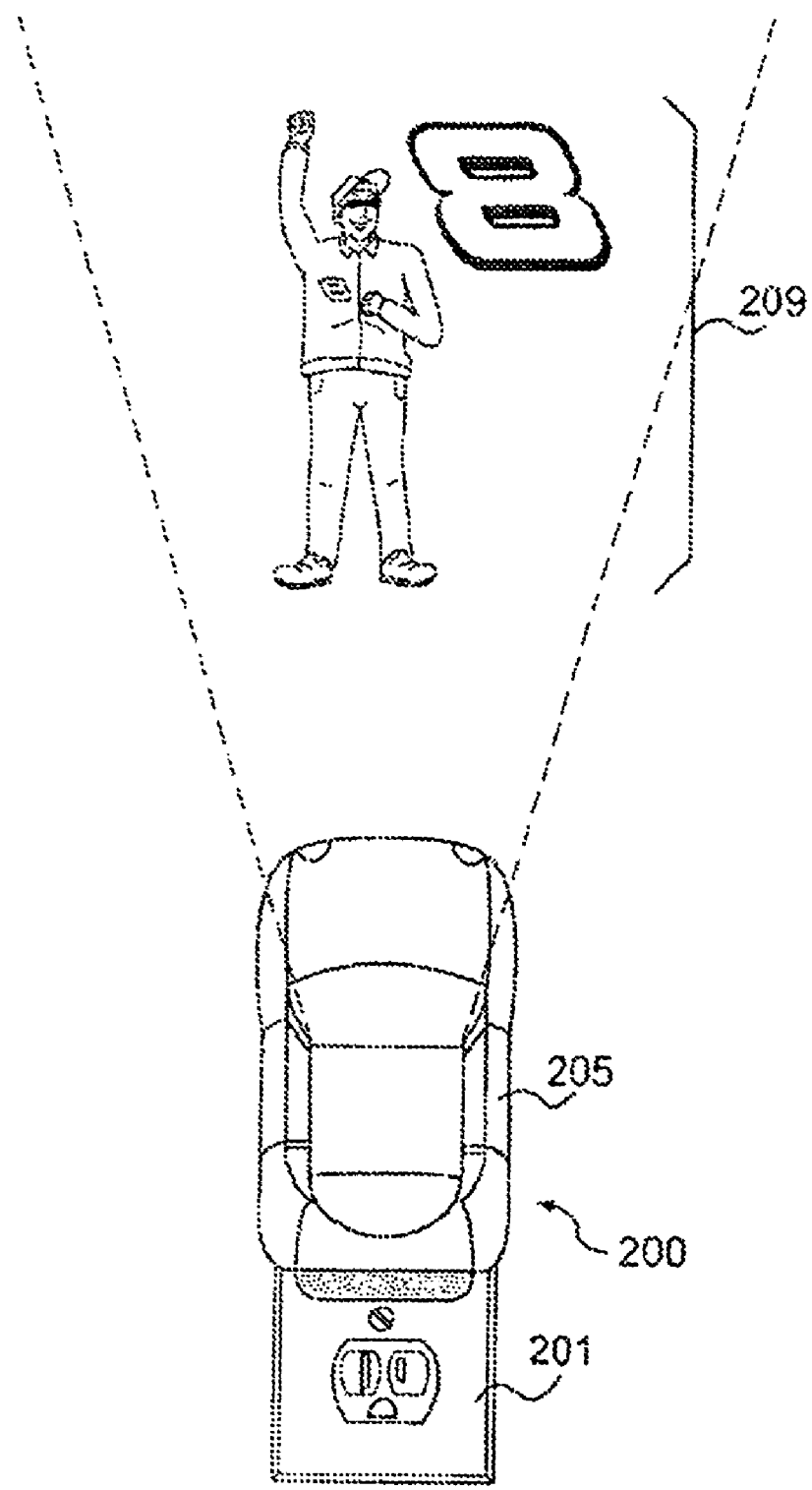
FIG. 2 illustrates a front elevational view of an image display device according to principles of the invention.

FIG. 2 shows an image projector according to principles of the present invention. The display device 200 can be plugged into a standard electrical socket 201 to upwardly project an image 209 along a wall proximate the display device. Other types of power supplies, such as one or more batteries, may also be used. While the drawing shows an upwardly projected image, the invention can be used to project the image along the wall and/or ceiling in any direction. Moreover, the invention may provide a single display device that can project the image in varying directions.

The display device 200 may be capable of projecting an image from a single, fixed image representation of an image, like a slide. Alternatively, the representation of the image can be removable so that any number of images could be displayed by a single display device by simply changing the slide. The images projected by the display device 200 may be of, for example, any theme or figure related to sports, vehicles, cartoons, movies, politics, nature, holiday, fantasy, art, music, science fiction, and locations.

According to an embodiment of the invention, multiple slides may be used and alternated so that the projected image changes. By way of one example, a slide may include a digital memory that holds one or more digital images. Images from the memory are displayed within the slide, such as in a manner similar to computer implemented projectors. The slide has a processor for automatically changing the images displayed on the slide, thereby changing the images projected. The slide may have an input to enable a user to upload images, such as from a digital camera or computer, thereby allowing customization of the image or images to be projected.

The display device 200 may have a decorative housing 205. Here, the housing 205 is a stock racing car projecting the image 209 of a celebrating driver through its windshield. Other embodiments may also be used.

The housing 205 may be designed to relate to the image and/or images projected. For example, the display shell may have a design related to, for example, any sports theme, vehicle theme, cartoon theme, movie theme, political theme, nature theme, holiday theme, fantasy theme, art theme, music theme, science fiction theme, and location theme. The housing 205 may be fabricated from any material suitable for a projection display device such as plastic, ceramic, metal, or glass. The housing 205 may also be adapted in any suitable manner to allow light to pass through a portion thereof to permit the projection of an image.

The display device 200 illustrated in FIG. 2 has a night light structure that is plugged directly into the socket. According to an embodiment of the invention, a separate display device may be provided using a desk lamp type structure that can be powered, for example, by a battery or via an electrical cord. The housing 205 can also be adapted to let another electrical device to be plugged into display device 200.

Figure 3:
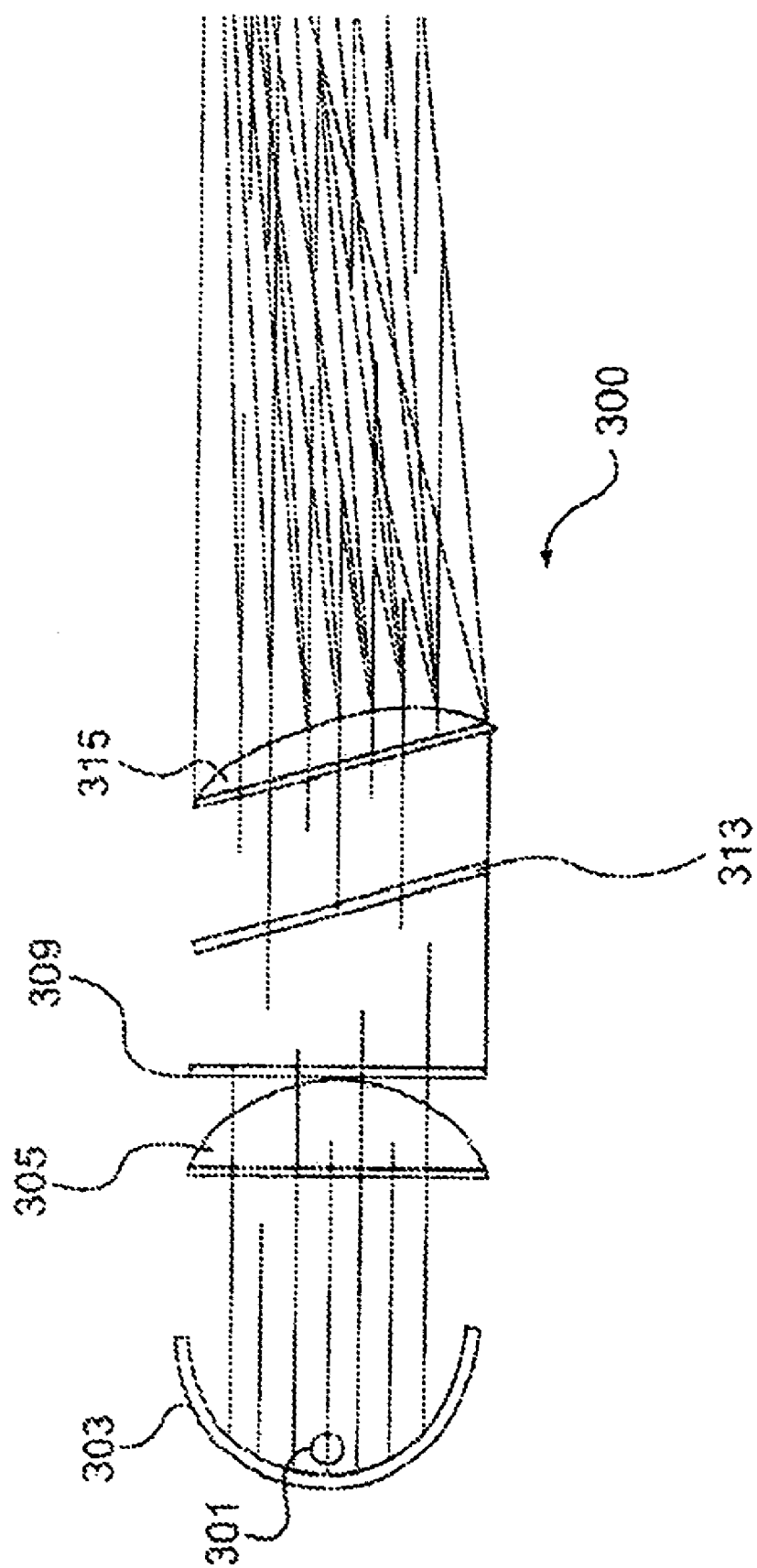
FIG. 3 illustrates a side elevational view of an optical path for an image display device according to an embodiment of the invention.

Now an optical path of the display device according to an embodiment of the invention will be described. As can be seen in FIG. 3, optical path 300 includes a light source 301 that shines a light towards the representation of the image or slide 309. Because the light emitted from the light source 301 scatters in all directions, a reflection mirror 303 may be provided to reflect scattered light back towards the slide. Any light source can be used, including, but not limited to, an incandescent bulb, a fluorescent bulb, a neon (i.e., inert gas) bulb, a halogen bulb, and a light emitting diode ("LED"). The electrical components provided, such as one or more ballasts, will depend on the type of light source selected, as is well-known by those persons having ordinary skill in the art. An LED may be advantageous, however, because of its low power consumption, low heat emission, and high luminance properties as compared to other types of light sources.

Another lens, such as lens 305, can be interposed between the light source 301 and slide 309 to concentrate light onto to the slide. This lens may be an optical lens, such as a plano-convex lens. The light passes through slide 309 and strikes a fresnel lens 313 at an angle with respect to the slide 309. The angle can be anywhere from about zero (0) degrees to ten (10) degrees but an angle of about zero (0) degrees is shown. The fresnel lens 313 changes the direction of light and focuses it towards the projection/objective lens 315. The objective lens 315 has a surface, which may be asymmetrical, and can be at an angle of about zero (0) degrees to about twenty (20) degrees, but an angle of about ten (10) degrees is shown. Ideally, the fresnel lens 313 is disposed at substantially the same angle as the objective lens 315. Light then passes through the objective lens 315 where the image is projected onto the substantially parallel surface.

According to an embodiment of the present invention, the distance from the light source 301 to the center of objective lens 315 is in the range of about 75 mm and about 225 mm, more specifically in the range of about 112.5 mm and about 187.5 mm, and more specifically about 150 mm. But any distance may be suitable depending on, for example, the desired size of the image projection, the size of the slide, or the focal length of the objective lens. According to an embodiment of the invention, the projected image may be at least about 15 times larger than the image representation, and more specifically the projected image may be at least about 30 times larger than the image representation.

Accordingly, the optical path 300 accommodates the vary distances of the portion of a surface onto which the image is projected by angling a path of light projecting from the objective lens 315 to display an image. Such an arrangement eliminates the "fun-house" mirror effect distortion and permits display of a substantially focused image.

Figure 4:
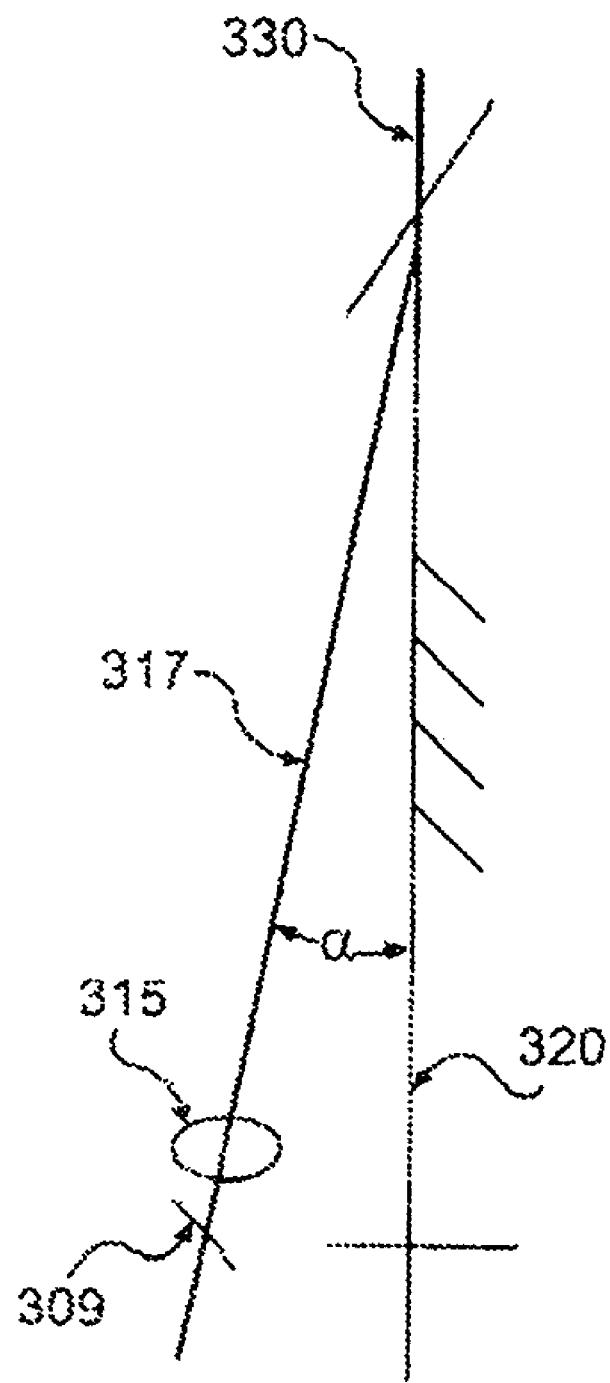
FIG. 4 illustrates a representative view of an angle between the projection surface and an objective lens according to an embodiment of the invention.

FIG. 4 illustrates an angle a of the common optical axis 317 of the slide 309 and objective lens 315 in relation to the surface 320 upon which the image 330 is projected.

Because the display device of the invention can be used as a night light proximate the wall 320, the display device must be able to project a substantially clear image at a highly acute, tight angle that is substantially parallel to the surface. Here, the angle .alpha. is shown to be about 5.7 degrees, but the display device of the invention is suitable for projecting the image 330 when the angle between the common optical axis 317 and the surface 320 is at other angles, such as less than about 10 degrees.

Figure 5:
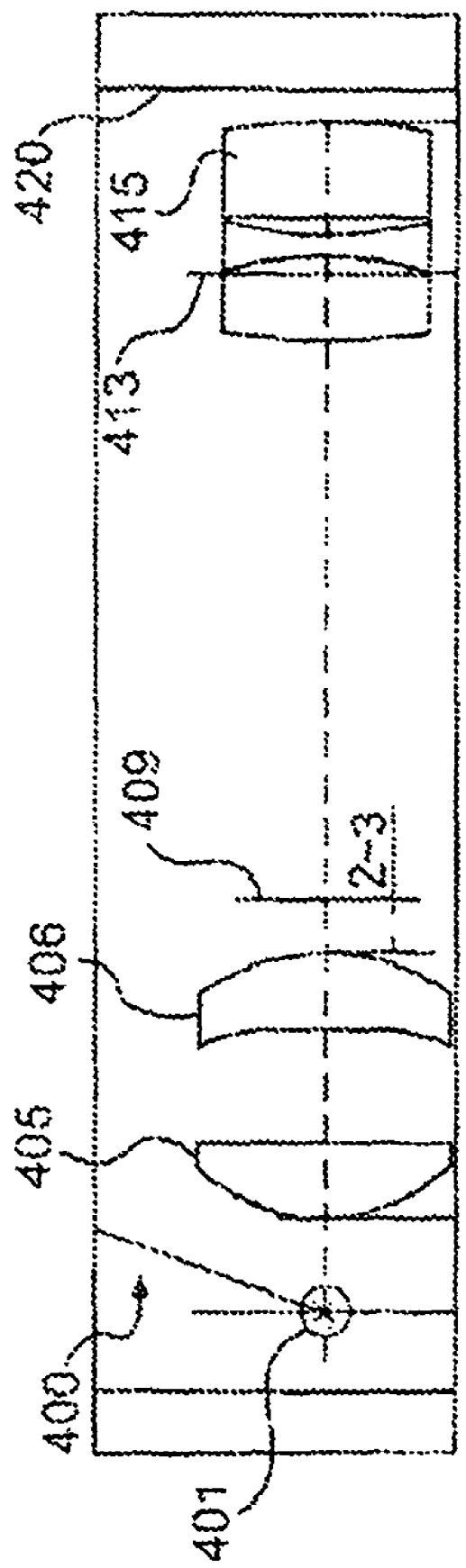
FIG. 5 illustrates a side elevational view of an optical path for an image display device according to another embodiment of the invention.

Now an optical path of the display device according to another embodiment of the invention will be described. Looking at FIG. 5, optical path 400, includes a light source 401 projecting light towards a condenser lens 405 that collects emitted light. The light collected by the condenser lens 405 then passes through a light adjusting lens 406 that concentrates light on the slide 409. The light beam passing through the slide 409 then passes through a grating lens 413. The grating included on lens 413 diffracts the light so that it strikes projection/objective lens 415 at an angle. This angle may be about zero (0) degrees to about ten (10) degrees but an angle of about zero (0) degrees is shown. The grating diffracts the light at a number of angles accounting for the varying distances of the surface portions onto which the image is projected. Light then passes through the objective lens 415 to project the image onto the substantially parallel surface 420.

While the invention has been described in terms of particular embodiments, those skilled in the art will recognize that the invention can be practiced with modifications in the spirit and scope of the appended claims. These examples given above are merely illustrative and are not meant to be an exhaustive list of all possible designs, embodiments, applications, or modifications of the invention.

What is claimed is:

1. An image display device for displaying an image on a surface, comprising:
   a housing configured to be located proximate to the surface;
   a light source arranged on said housing;
   an image representation disposed in a path of light emitted from said light source, wherein said image representation is a distorted representation of the image; and
   an objective lens disposed proximate said image representation to project an image projection onto a surface substantially parallel to the path of light emitted from said light source through said image representation and said objective lens.

2. The image display device of claim 1, wherein a distance from said light source to a center of said objective lens is at a range of about 75 mm and about 225 mm.

3. The image display device of claim 1, further comprising a reflection mirror reflecting light emitted from said light source toward said image representation.

4. The image display device of claim 3, further comprising a planoconvex lens disposed between said light source and said image representation.

5. The image display device of claim 4, wherein said planoconvex lens is adjacent to said image representation.

6. The image display device of claim 4, further comprising a fresnel lens disposed between said image representation and said objective lens.

7. The image display device of claim 1, wherein said image representation is substantially similar to the image.

8. The image display device of claim 1, wherein the image projection is at least about 15 times greater in size than said image representation.

9. The image display device of claim 1, wherein said objective is arranged so that an angle between an axis of the path of light projected from a center of said objective lens and the surface is less than about 10 degrees.

10. The image display device of claim 1, wherein the surface is a wall, and wherein said housing attaches to the wall via an electrical outlet.

11. An image display device for displaying an image on a surface, comprising:
    a light source for emitting light;
    means for mounting said light source proximate the surface;
    means for representing the image disposed in a path of light emitted from said light source;
    means for concentrating light projected from said light projecting means towards said image representation means and
    a means for projecting the image disposed proximate said image representation means to project an image projection onto a surface substantially parallel to the path of light emitted from said light source through said image representation means and said image projecting means,
    wherein the image projection is substantially similar to the image 12. The image display device of claim 11, wherein a distance from said light source to a center of said image projecting means is at a range of about 75 mm and about 225 mm.

13. The image display device of claim 12, further comprising a means for projecting light from said light source towards said image representation means.

14. The image display device of claim 12, wherein the projected image is about 15 times greater in size than said image representation means.

15. The image display device of claim 12, wherein an angle between an axis of the path of light projected from a center of said image projecting means and the surface is less than about 10 degrees.

16. The image display device of claim 11, wherein the surface is a wall, and wherein said means for mounting attaches to the wall via an electrical outlet.

17. A night light for displaying an image on a surface, comprising:
    a housing configured to be located proximate to the surface;
    a light source;
    a representation of the image disposed in a path of light emitted from said light source; and
    a reflection minor reflecting light from said light source toward said representation of the image;
    a concentration lens that concentrates light from said light source onto said representation of the image;
    a condensing lens disposed between said light source and said representation of the image; and
    an objective lens disposed proximate said representation of the image to project a projected image onto a surface substantially parallel to the path of light emitted from said light source through said representation of the image and said objective lens; and an orientation lens that orients an angle of light incident to the objective lens.

18. The night light of claim 17, wherein said surface is a wall, and wherein said housing attaches to the wall via an electrical outlet.

19. The night light of claim 17, wherein an angle between an axis of the path of light projected from a center of said image projecting means and the surface is less than about 10 degrees.

20. The night light of claim 17, wherein the light source is a light bulb or an LED.

* * * * *